(12) United States Patent
Torno (10) Patent No.: US 8,126,955 B2
(45) Date of Patent: Feb. 28, 2012

(54) N BIT ADDER AND THE CORRESPONDING ADDING METHOD

(75) Inventor: Daniel Torno, Orleans (FR)

(73) Assignee: S.A.R.L. Daniel Torno, Orleans (FR)

( * ) Notice: Subject to any disclaimer, the term of this patent is extended or adjusted under 35 U.S.C. 154(b) by 1022 days.

(21) Appl. No.: 12/066,638

(22) PCT Filed: Sep. 6, 2006

(86) PCT No.: PCT/FR2006/002045
§ 371 (c)(1),
(2), (4) Date: Mar. 12, 2008

(87) PCT Pub. No.: WO2007/031622
PCT Pub. Date: Mar. 22, 2007

(65) Prior Publication Data
US 2008/0228847 A1 Sep. 18, 2008

(30) Foreign Application Priority Data
Sep. 12, 2005 (FR) ..................................... 05 09278

(51) Int. Cl.
*G06F 7/508* (2006.01)
(52) U.S. Cl. ........................................................ 708/712
(58) Field of Classification Search .................... None
See application file for complete search history.

(56) References Cited

U.S. PATENT DOCUMENTS

| | | | | |
|---|---|---|---|---|
| 5,257,218 A | * | 10/1993 | Poon | 708/712 |
| 5,844,777 A | * | 12/1998 | Gates | 361/700 |
| 7,152,089 B2 | * | 12/2006 | Harris | 708/710 |
| 7,680,874 B2 | * | 3/2010 | Takegama et al. | 708/710 |
| 2004/0267863 A1 | * | 12/2004 | Bhushan et al. | 708/710 |

OTHER PUBLICATIONS

International Search Report of application No. PCT/FR 2006/002045 filed Sep. 6, 2006.
XP010230844, ISBN 0-7803-3844-8, Arjhan C et al. (Apr. 12, 1997).
International preliminary report on patentability of application No. PCT/FR2006/002045.

* cited by examiner

*Primary Examiner* — David H Malzahn
(74) *Attorney, Agent, or Firm* — David D. Brush; Westman, Champlin & Kelly, P.A.

(57) ABSTRACT

An n bit adder includes first computing circuit with 2n inputs for receiving n values of bits of first and second binary numbers and an additional input for receiving an input carry digit. The first computing circuit elaborates from each of the n pairs of bit values of the same significance, a carry digit propagating signal and diagonal generation signals. The adder further including: an estimating circuit performing a first estimation of each coefficient of the number resulting from the sum of the first and second numbers, by using the complement of the corresponding bit of significance of the first number; a second computing circuit, elaborating a set of correcting signals based on the propagating signals and the diagonal generation signals; a correcting block applying to each estimated value of bit of significance k of the sum, k+1 corrections using the correcting signals, and delivering n bits of the sum.

19 Claims, 7 Drawing Sheets

N BIT ADDER AND THE CORRESPONDING ADDING METHOD

CROSS-REFERENCE TO RELATED APPLICATIONS

This application is a Section 371 National Stage application of International application No. PCT/FR2006/002045, filed Sep. 6, 2006, and published as WO 2007/031622A1 on Mar. 22, 2007, not in English.

FIELD OF THE DISCLOSURE

The disclosure concerns adders and particularly adders of the Carry-Look-Ahead adder (CLA) type, or adders of the carry propagation type ("Ripple Carry Adder").

BACKGROUND OF THE DISCLOSURE

Conventionally, in order to make an addition between two binary numbers, a standard adder calculates each bit of the resulting sum from the bits of the same rank of each binary input number, and of a carry propagated by the addition of the bits of lower rank.

In other words, these standard adders effect the sum of the two bits of the rank in question of the two binary input numbers, and then make a positive correction if necessary using the propagated carry.

For example, the U.S. Pat. Nos. 6,175,852 and 5,636,156 (IBM) present this type of adder.

The U.S. Pat. No. 6,578,063 (IBM) also presents a standard adder but with five input binary numbers.

The U.S. Pat. No. 5,719,803 (Hewlett Packard Company) keeps the structure of a standard adder while affording an improvement based on Ling's equations.

One of the drawbacks of this type of adder concerns the testability of the logic gates of the adder. This is because, so as to check the behaviour of the gates, it is necessary to use a set of vector tests in order to detect any error in behaviour of the adder. In the case of these standard adders, the number of vectors in this set of tests may be extremely high.

The article "On the Adders with Minimum Tests" by Seiji Kajihara and Tsutomu Sasao proposes to improve the testability of these standard adders by modifying certain gates but without changing the general structure of the adder.

SUMMARY

According to a first aspect of the invention, an n-bit adder of first and second binary numbers, comprising a first calculation means with two n inputs for receiving the n values of bits of said first and second binary numbers and an additional input for receiving an input carry. Said first calculation means is able to produce, from each of the n pairs of values of bits of the same rank, a carry propagation signal.

According to a general characteristic of this first aspect of the invention, the first calculation means is able also to produce n diagonal-generation signals, each diagonal-generation signal being produced from the value of the bit of rank k of the second number, k varying between 0 and n−1, and the value of the bit of rank k−1 of the first number or of the input carry if said coefficient of rank k−1 does not exist. The adder also comprises:

an estimation means able to perform a first estimation of each coefficient of the number resulting from the sum of the first and second numbers, taking the complementary of the value of the bit of corresponding rank of the first number, a second calculation means connected to the first calculation means and able to produce a set of correction signals from the propagation signals and diagonal-generation signals, a correction block comprising n outputs and able to apply, to each estimated bit value of rank k of said sum, k+1 corrections by means of said correction signals, and to deliver as an output the n bits of the sum of the first and second numbers.

In other words, after a first estimation of the final result, the adder performs n successive corrections that may be positive, negative or zero. These corrections are made not only by means of the bits of the input numbers and input carry, but also by means of the bit of preceding rank of the first binary number, by means of the diagonal-generation signals.

The adder allows a novel implementation that has in particular the advantage of improving its testability compared with a standard adder. Indeed, simulations in Verilog language demonstrated for example that 9 test vectors suffice for testing a 4-bit adder.

According to one embodiment, the estimation means is able also to perform a first estimation of a carry resulting from said sum of first and second numbers, from the most significant bit of the first number.

The second calculation means can also produce a set of supplementary signals for correcting said resultant, from the propagation signals and the diagonal-generation signals.

The correction block may also comprise a supplementary output for delivering said resulting carry, and is able to apply, to the estimated bit value of the resulting carry, k+1 corrections by means of said supplementary correction signals.

Preferably, the diagonal generation signal of rank k is estimated according to the following expression:

$$q_k = \overline{(b_k \oplus a_{k-1})}$$

where:

$q_k$ is the diagonal-generation signal of rank k, $b_k$ is the bit of rank k of the second binary number.

$a_{k-1}$ is the bit of rank k−1 of the first binary number.

Preferably, the $p^{th}$ correction signal of the bit of rank k, with p varying between 0 and k, is determined according to the following expression:

$$C_k^p = q_k, \text{ if } p = 0,$$

$$C_k^p = \left[\prod_{i=1}^{p} t_{k-i}\right] \cdot q_{k-p} \text{ otherwise,}$$

where:

$C_k^p$ is the $p^{th}$ correction signal of the bit of rank k of the resulting sum, $t_i$ is the carry propagation signal produced from the bits of rank i of the first and second binary numbers, $q_k$ is the diagonal-generation signal of rank k.

Preferably, the bit of rank k of the resulting sum is determined according to the following expression:

$$s_k = \overline{a}_k \oplus \sum_{i=0}^{k} C_k^i,$$

where:

$s_k$ is the bit of rank k of the resulting sum, $a_k$ is the bit of rank k of the first binary number, $C_k^i$ is the $i^{th}$ correction signal of the bit of rank k of the resulting sum.

According to one embodiment, the first calculation means comprises n pairs of "EXCLUSIVE OR" and "EXCLUSIVE OR complement" gates such that, for the $k^{th}$ pair, the "EXCLUSIVE OR complement" gate is able to receive as an input the bit of rank k of the second binary number and bit of rank k−1 of the first binary number or the input carry is said bit of the first binary number of rank k−1 does not exist, and able to deliver as an output the corresponding diagonal-generation signal, and such that, for said $k^{th}$ pair, the "EXCLUSIVE OR" gate is able to receive the bits of rank k of the first and second binary numbers and is able to deliver the carry propagation signal of corresponding rank.

According to one embodiment, the second calculation means comprises, for producing each correction signal for the bit of rank k, k "AND" gates, the $i^{th}$ gate being able to produce a correction signal from the carry propagation and carry generation signals delivered as an input to said "AND" gates.

According to one embodiment, the correction block comprises, for producing the bit of rank k of the resulting sum k+1, "EXCLUSIVE OR" gates connected in series, each gate being able to:

receive the estimated bit of rank k or the bit of rank k delivered by the "EXCLUSIVE OR" gate connected upstream, and a correction signal, perform a correction to the signal received as an input from said correction signal received.

Moreover, according to another aspect of the invention, there is proposed a system of adding j bits such that j is greater than 2, comprising j−1 adders as described above and connected in series, each adder being able to receive as an input a first binary number and a second binary number corresponding to the sum of two other binary numbers, which is delivered by the adder connected upstream.

According to another aspect of the invention, there is also proposed a system of adding j bits, such that j is greater than 2, comprising a set of adders as described above connected in parallel, in which said second calculation means of each adder:

also comprises an output able to deliver a group propagation signal corresponding to the product of all the carry propagation signals, produced by said first calculation means, is able to produce said set of supplementary correction signals for said resulting carry, from the propagation signals and the diagonal-generation signals, as well as the complementary signal of the first bit of the second input binary number.

The system can also comprise at least one group propagation module connected to all the adders and able to receive said resulting carry and said group propagation signal produced by each adder and to produce firstly the input carry of an adder from the resulting carry and the group propagation signal of the previous adder, and secondly a new resulting carry and a new group propagation signal from the resulting carries and the group propagation signals of all the adders.

According to one embodiment of this third aspect of the invention, the system comprises a first set of propagation modules connected in parallel to the output of the adders, and another propagation module, connected to the output of said first set of propagation modules, able to receive the new resulting carry and the new group propagation signal of each propagation module of said first set, and able to produce, from each new resulting carry and each new group propagation signal, a new output carry and a new output group propagation signal.

According to another aspect of the invention, there is proposed a method of adding first and second n-bit binary numbers, comprising a phase of receiving the n values of bits of said first and second binary numbers and of an input carry, and a first calculation phase comprising the production, from each of the n pairs of values of bits of the same rank, of a carry propagation signal.

According to a general characteristic of this other aspect of the invention, the first calculation phase also comprises the production of n diagonal-generation signals, each diagonal-generation signal being produced from the value of the bit of rank k of the second number, k varying between 0 and n−1, and the value of the bit of rank k−1 of the first number or of the carry if said coefficient of rank k−1 does not exist. The method also comprises:

a phase of estimating each coefficient of the resulting number of the sum of the first and second numbers, taking the complementary of the value of the bit of corresponding rank of the first number, a second calculation phase comprising the production of a set of correction signals from the propagation signals and diagonal-generation signals, a correction phase comprising the application, to each estimated bit value of rank k of said sum, of k+1 corrections by means of said correction signals, and the delivery as an output of the n bits of the sum of the first and second numbers.

According to one embodiment, the estimation phase also comprises a first estimation of a carry resulting from said sum of the first and second number, from the most significant bit of the first number.

The second calculation phase can also comprise the production of a set of supplementary correction signals for said resulting carry, from the propagation signals and diagonal-generation signals.

The correction phase can also comprise the delivery of said resulting carry, and the application, to the estimated bit value of the resulting carry, k+1 corrections using said supplementary correction signals.

Preferably, the diagonal-generation signal of rank k is determined according to the following expression:

$$q_k = \overline{(b_k \oplus a_{k-1})}$$

where:

$q_k$ is the diagonal-generation signal of rank k, $b_k$ is the bit of rank k of the second binary number.

$a_{k-1}$ is the bit of rank k−1 of the first binary number.

Preferably, the $p^{th}$ correction signal of the bit of rank k, with p varying between 0 and k, is determined according to the following expression:

$$C_k^p = q_k, \text{ if } p = 0,$$

$$C_k^p = \left[\prod_{i=1}^{p} t_{k-i}\right] \cdot q_{k-p} \text{ otherwise,}$$

where:
$C_k^p$ is the $p^{th}$ correction signal for the bit of rank k of the resulting sum,
$t_i$ is the carry propagation signal produced from the bits of rank i of the first and second binary numbers,
$q_k$ is the diagonal-generation signal of rank k.

Preferably, the bit of rank k of the resulting sum is determined according to the following expression:

$$s_k = \overline{a}_k \oplus \sum_{i=0}^{k} C_k^i,$$

where:
$s_k$ is the bit of rank k of the resulting sum,
$a_k$ is the bit of rank k of the first binary number,
$C_k^i$ is the i correction signal of the bit of rank k of the resulting sum.

According to one embodiment, the first calculation phase comprises n pairs of "EXCLUSIVE OR" and "EXCLUSIVE OR complement" operations such that, for the $k^{th}$ pair of operations, the "EXCLUSIVE OR complement" operation comprises the reception as an input of the bit of rank k of the second binary number and of the bit of rank k−1 of the first binary number or of the carry if said bit of rank k−1 of the first binary number does not exist, and comprises the delivery as an output of the corresponding diagonal-generation signal, and such that, for said $k^{th}$ pair of operations, the "EXCLUSIVE OR" operation comprises the reception of the bits of rank k of the first and second binary numbers and the delivery of the carry propagation signal of corresponding rank.

According to one embodiment, the second calculation phase comprises, for the production of each correction signal of the bit of rank k, k "AND" operations, the $i^{th}$ operation comprising the production of the correction signal from the carry generation and carry propagation signals.

According to one embodiment, the correction phase preferably comprises, for producing the bit of rank k of the resulting sum, k+1, "EXCLUSIVE OR" operations in series, comprising the reception of the estimated bit of rank k or of the bit of rank k processed during the previous "EXCLUSIVE OR" operation of the correction phase, and a correction signal, each "EXCLUSIVE OR" operation comprising the correction of the signal received as an input, from said correction signal.

BRIEF DESCRIPTION OF THE DRAWINGS

Other advantages and characteristics will emerge from an examination of the detailed description of a method and in no way limitative embodiments of the invention, and of the accompanying drawings, in which.

DETAILED DESCRIPTION OF ILLUSTRATIVE EMBODIMENTS

Figure 1:
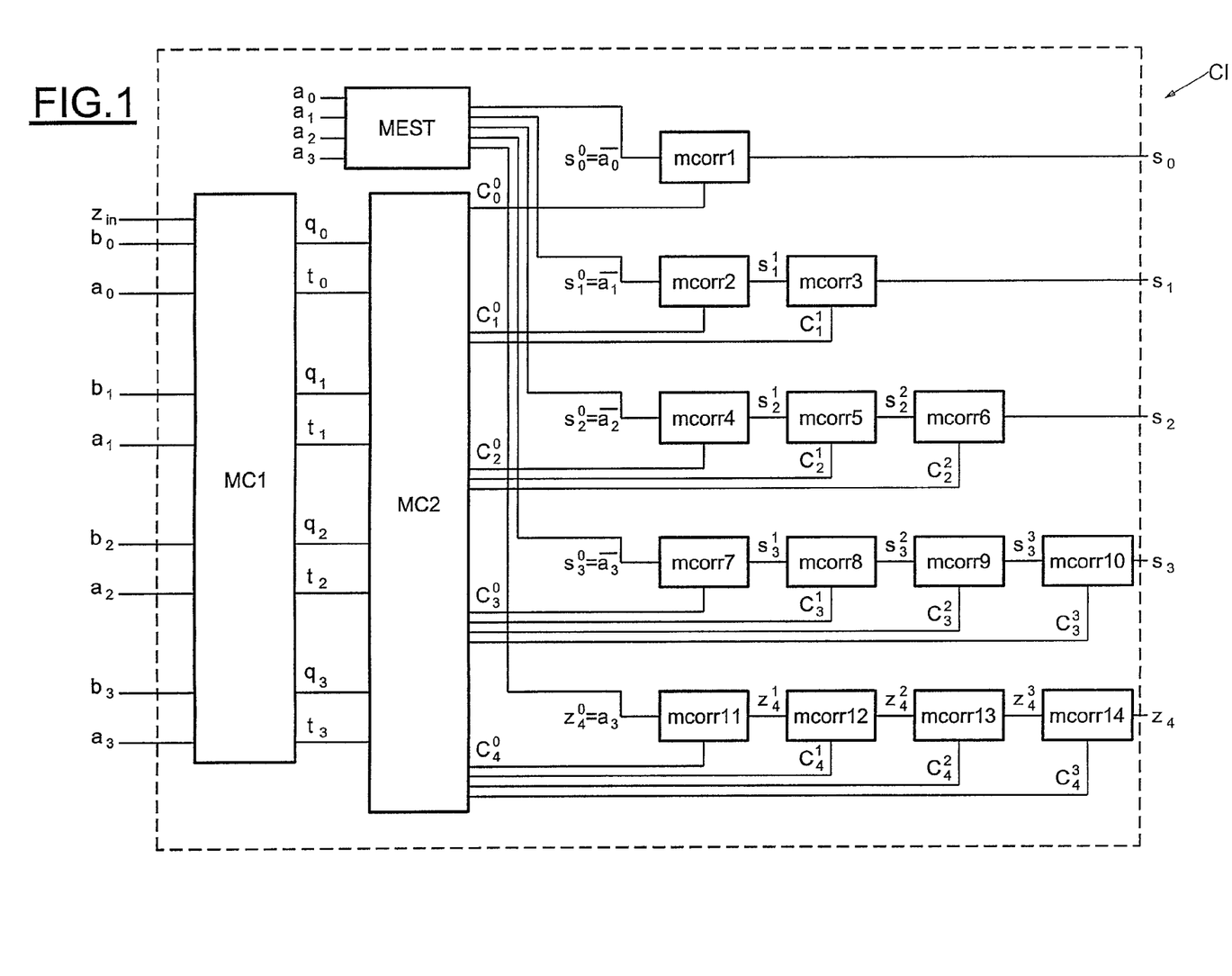
FIG. 1 depicts schematically a first embodiment of an adder according to an embodiment of the invention.

FIG. 1 depicts an integrated circuit CI. The reference ADD represents an adder according to an embodiment of the invention. In comprises a first calculation means MC1 able to receive two binary numbers A and B such that:

$$A = a_3 \cdot 2^3 + a_2 \cdot 2^2 + a_1 \cdot 2 + a_0$$

$$B = b_3 \cdot 2^3 + b_2 \cdot 2^2 + b_1 \cdot 2 + b_0$$

In this example, the first binary numbers A and B comprise four bits but the example applies more generally to any n-bit binary number. In addition, in this example, A is considered to be the first binary number and B to be the second binary number, but their role can of course be interchanged.

The first calculation means MC1 comprises here a first input for the input carry $z_{in}$ and four pairs of inputs for the four bits of the first and second binary number, respectively $a_0$ and $b_0$, $a_1$ and $b_1$, $a_2$ and $b_2$ and $a_3$ and $b_3$.

From these input bits, the first calculation means MC1 produces two types of signal: carry propagation signals $t_n$ and diagonal-generation signals $q_n$. The carry propagation signals $t_n$ and the diagonal-generation signals $q_n$ can be expressed in the form:

$$\begin{cases} t_n = b_n \oplus a_n \\ q_n = \overline{(b_n \oplus a_{n-1})} \end{cases} \text{ and } q_0 = \overline{b_0 \oplus z_{in}}$$

The diagonal-generation signals were produced by the inventor by virtue in particular of a new expression of the bits of the resulting sum of the first and second input binary numbers of the adder and of the carry resulting from this same addition.

This is because, starting from an expression of the resulting carry $z_n$ and the bits of the sum $s_n$:

$$\begin{cases} z_n = g_{n-1} + p_{n-1} \cdot z_{n-1} \\ s_n = t_n \oplus z_n \end{cases}$$

and signals generating a carry in n, $g_n$, signals propagating or generating a carry in n, $p_n$ and signals propagating a carry in n without generation $t_n$, used by a standard adder, such that:

$$\begin{cases} g_n = a_n \cdot b_n \\ p_n = a_n + b_n \\ t_n = a_n \oplus b_n \end{cases}$$

the inventor established that the carry produced from each rank is expressed according to the following formula:

$$Z_n = a_{n-1} \oplus t_{n-1} \cdot q_{n-1} \oplus t_{n-1} \cdot t_{n-2} \cdot q_{n-2} \oplus t_{n-1} \cdot t_{n-2} \cdot t_{n-3} \cdot q_{n-3} \oplus \ldots \oplus t_{n-1} \cdot t_{n-2} \ldots t_1 \cdot t_0 \cdot q_0$$

where:

$q_n$ is the diagonal-generation signal according to the formula established above.

This, for the two binary numbers A and B cited previously, there comes:

$$\begin{cases} z_1 = a_0 \oplus t_0 \cdot q_0 \\ z_2 = a_1 \oplus t_1 \cdot q_1 \oplus t_1 \cdot t_0 \cdot q_0 \\ z_3 = a_2 \oplus t_2 \cdot q_2 \oplus t_2 \cdot t_1 \cdot q_1 \oplus t_2 \cdot t_1 \cdot t_0 \cdot q_0 \\ z_4 = a_3 \oplus t_3 \cdot q_3 \oplus t_3 \cdot t_2 \cdot q_2 \oplus t_3 \cdot t_2 \cdot t_1 \cdot q_1 \oplus t_3 \cdot t_2 \cdot t_1 \cdot t_0 \cdot q_0 \end{cases}$$

Consequently, by substituting $Z_n$ in:

$$S_n = t_n \oplus Z_n = a_n \oplus b_n \oplus Z_n$$

there is obtained:

$$\begin{cases} s_1 = \overline{a_1} \oplus q_1 \oplus t_0 \cdot q_0 \\ s_2 = \overline{a_2} \oplus q_2 \oplus t_1 \cdot q_1 \oplus t_1 \cdot t_0 \cdot q_0 \\ s_3 = \overline{a_3} \oplus q_3 \oplus t_2 \cdot q_2 \oplus t_2 \cdot t_1 \cdot q_1 \oplus t_2 \cdot t_1 \cdot t_0 \cdot q_0 \end{cases}$$

and $$S_0 = t_0 \oplus z_{in}$$

This new expression of the resulting carry at rank n, $z_n$, is obtained first of all by expressing it as a function of the carry propagation signal $t_{n-1}$, to rank n−1. As $z_n = g_{n1} + p_{n-1} \cdot Z_{-n1}$, there then comes, according to the conventional combinatorial logic rules:

$$z_n = g_{n-1} + p_{n-1} \cdot z_{n-1}$$

$$z_n = a_{n-1} \cdot b_{n-1} + (a_{n-1} + b_{n-1}) \cdot z_{n-1}$$

$$z_n = a_{n-1} \cdot b_{n-1} + (a_{n-1} \oplus b_{n-1} \oplus a_{n-1} \cdot b_{n-1}) \cdot z_{n-1}$$

$$z_n = a_{n-1} \cdot b_{n-1} + a_{n-1} \cdot b_{n-1} \cdot z_{n-1} + (a_{n-1} \oplus b_{n-1}) \cdot z_{n-1}$$

$$z_n = a_{n-1} \cdot b_{n-1} (1 + z_{n-1}) + (a_{n-1} \oplus b_{n-1}) \cdot z_{n-1}$$

$$z_n = a_{n-1} \cdot b_{n-1} + (a_{n-1} \oplus b_{n-1}) \cdot z_{n-1}$$

$$z_n = a_{n-1} \cdot b_{n-1} \oplus (a_{n-1} \oplus b_{n-1}) \cdot z_{n-1} \oplus a_{n-1} \cdot b_{n-1} \cdot (a_{n-1} \oplus b_{n-1}) \cdot z_{n-1}$$

$$z_n = a_{n-1} \cdot b_{n-1} \oplus (a_{n-1} \oplus b_{n-1}) \cdot z_{n-1}$$

$$z_n = g_{n-1} \oplus t_{n-1} \cdot z_{n-1}$$

By expressing the generation signal of a carry $g_{n-1}$ to rank n−1 as a function of the propagation signal of a carry $t_{n-1}$ to rank n−1 without generation, there comes:

$$g_{n-1} = a_{n-1} \cdot b_{n-1}$$

$$g_{n-1} = a_{n-1} \cdot (1 \oplus \overline{b_{n-1}})$$

$$g_{n-1} = a_{n-1} \oplus a_{n-1} \cdot \overline{b_{n-1}}$$

$$g_{n-1} = a_{n-1} \oplus \overline{b_{n-1}} \cdot (a_{n-1} \oplus b_{n-1})$$

$$g_{n-1} = a_{n-1} \oplus \overline{b_{n-1}} \cdot t_{n-1}$$

Consequently, by replacing the value of $g_{n-1}$ in the last expression of $z_n$ above, there comes:

$$z_n = a_{n-1} \oplus \overline{b_{n-1}} \cdot t_{n-1} \oplus z_{n-1} \cdot t_{n-1}$$

or $$z_n = a_{n-1} \oplus t_{n-1} \cdot (\overline{b_{n-1}} \oplus z_{n-1})$$

Consequently, in the light of the above, by replacing $z_{n-1}$ by $a_{n-2} \oplus t_{n-2} \cdot (\overline{b_{n-2}} \oplus Z_{n-2})$, (obtained by recurrence) there comes:

$$z_n = a_{n-1} \oplus t_{n-1} \cdot (\overline{b_{n-1}} \oplus a_{n-2} \oplus t_{n-2} \cdot (\overline{b_{n-2}} \oplus Z_{n-2}))$$

$q_n$ being defined by: $q_n = \overline{b_n \oplus a_{n-1}}$ and therefore qn−1 by: $q_{n-1} = \overline{b_n \oplus a_{n-2}}$: there comes:

$$z_n = a_{n-1} \oplus t_{n-1} (q_{n-1} \oplus t_{n-2} \cdot (b_{n-2} \oplus Z_{n-2}))$$

By replacing the term $z_{n-1}$ by expressions obtained by recurrence, the formula of $z_n$ mentioned above is obtained, The first calculation block MC1 therefore delivers the carry propagation and diagonal-generation signals of rank 0 to 3, respectively $q_0$ and $t_0$, $q_1$ and $t_1$, $q_2$ and $t_2$ and $q_3$ and $t_3$.

The adder ADD also comprises an estimation means MEST that receives as an input the bits of the first binary number A, that is to say $a_0$, $a_1$, $a_2$ and $a_3$.

From these various inputs, the estimation means MEST estimates the bits of the sum $s_n$ of the two binary numbers A and B.

In other words, the bits $s_n$ of the of the sum S of the numbers A and B will firstly be estimated as being equal to the complementary of the bits of the first binary number A, that is to say $\overline{a_0}, \overline{a_1}, \overline{a_2}$ and $\overline{a_3}$.

Moreover, the adder ADD comprises a second calculation means MC2 connected to the first calculation means MC1.

The first calculation means MC1 then delivers the various carry propagation and diagonal-generation signals $q_0, t_0, \ldots q_3, t_3$ to the second calculation means MC2.

From these various input signals, the second calculation means MC2 produces correction signals that are applied to the various estimations of the bits of the resulting sum of A and B delivered by the estimation means MEST.

The various correction signals $C_0^0, C_1^0, C_1^1, C_2^0, \ldots C_2^2, C_3^0, \ldots C_3^3$ are calculated from the following formula:

$$\begin{cases} C_0^0 = q_0 \\ C_1^0 = q_1, C_1^1 = t_0 \cdot q_0 \\ C_2^0 = q_2, C_2^1 = t_1 \cdot q_1, C_2^2 = t_1 \cdot t_0 \cdot q_0 \\ C_3^0 = q_3, C_3^1 = t_2 \cdot q_2, C_3^2 = t_2 \cdot t_1 \cdot q_1, C_3^3 = t_2 \cdot t_1 \cdot t_0 \cdot q_0 \end{cases}$$

The second calculation means MC2 delivers the correction signals to various correction means, mcorr1, . . . mcorr14.

The correction signal $C_0^0$ is applied to the first estimation of the first bit of the sum $s_0^0$, that is to say $\overline{a_0}$. This correction makes it possible to obtain the definitive bit of rank O of the sum S, that is to say $s_0$.

The first estimation $s_1^0$ of the second bit of the sum $s_1$, is corrected on the first occasion by means of the block mcorr2, which receives the correction signal $C_1^0$. The correction block mcorr2 then delivers a second estimation $s_1^1$ of the bit $s_1$ of the sum of the numbers A and B. This second estimation $s_1^1$ is delivered to the correction block mcorr3, which also receives the correction signal $C_1^1$. The correction block mcorr3 then delivers the bit $s_1$ of the sum S.

Likewise, the first estimation $s_2^0$ of the third bit $s_2$ of the sum S is corrected successively by the correction blocks mcorr4, mcorr5 and mcorr6, which receive respectively the correction signals $C_2^0$, $C_2^1$ and $C_2^2$.

Likewise, the third estimation $s_3^0$ of the fourth bit $s_3$ of the sum S is corrected successively by the four correction blocks mcorr7, mcorr8, mcorr9 and mcorr10, which receive respectively the correction signals $C_3^0$, $C_3^1$, $C_3^2$ and $C_3^3$.

The adder ADD comprises an additional output for delivering a carry $z_4$ corresponding to the carry of the sum of the two numbers A and B.

This supplementary output may not exist, for example in the case of an adder used for carrying out a circular addressing on 16 values, used in particular in digital filtering of a signal for addressing the 16 coefficients of the filter or for calculating the fast Fourrier transformation.

Just as for the various coefficients $s_0 \ldots s_3$ of the sum S, the resulting carry $z_4$ is estimated by the estimation means MEST. At the end of the first estimation, the carry $z_4^0$ is equal to the most significant bit of the first binary number, that is to say $a_3$.

This first estimation is corrected by means of four correction blocks mcorr11, mcorr12, mcorr13 and mcorr14, which received respectively the correction signals $C_4^0, \ldots, C_4^3$.

These correction signals are delivered by the second calculation means MC2 and are produced from the following formula:

$$C_4^0 = t'_3 \cdot q_3, \ C_4^1 = t_3 t_2 q_2, \ C_4^2 = t_3 \cdot t_2 \cdot t_1 \cdot q_1,$$
$$C_4^3 = t_3 \cdot t_2 \cdot t_1 \cdot t_0 \cdot q_0.$$

Finally, the bits of the sum S and the resulting carry $z_4$ are obtained by the formulae:

$$\begin{cases} S_0 = S_0^0 \oplus C_0^0 \\ S_1 = S_1^0 \oplus C_1^0 \oplus C_1^1 \\ S_2 = S_2^0 \oplus C_2^0 \oplus C_2^1 \oplus C_2^2 \\ S_3 = S_3^0 \oplus C_3^0 \oplus C_3^1 \oplus C_3^2 \oplus C_3^3 \end{cases}$$

and $$Z_4 = a_3 \oplus C_4^0 \oplus C_4^1 \oplus C_4^2 \oplus C_4^3$$

Figure 2:
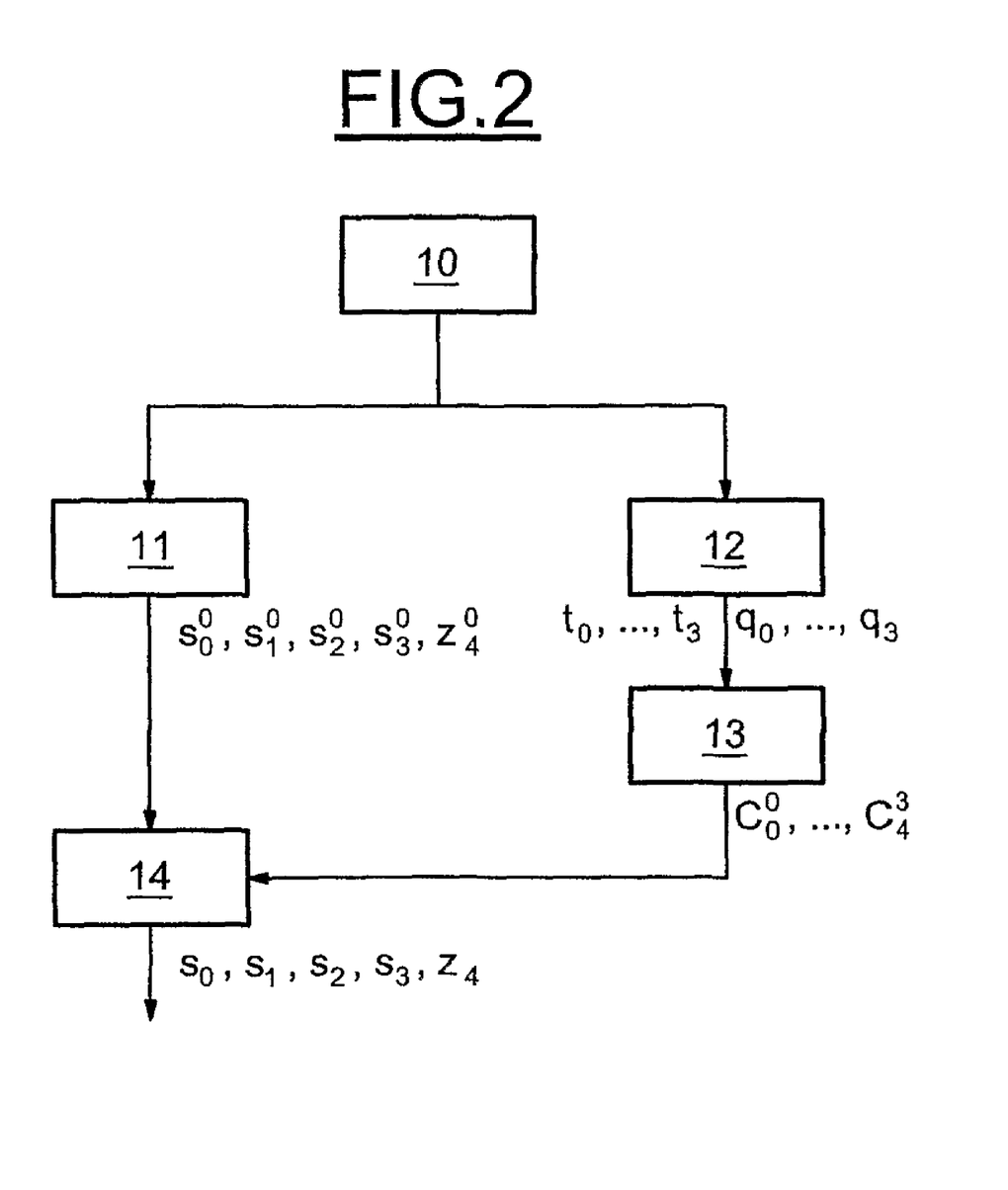
FIG. 2 depicts an embodiment of the method according to an embodiment of the invention.

Reference is now made to FIG. 2, which illustrates an example of a method used by an adder according to an embodiment of the invention.

During a first step 10, the adder receives the bits of the two numbers to be added, respectively A and B, and an input carry $z_{in}$.

During step 11, a first estimation of the resulting sum S of the binary numbers A and B is made from the bits of the first binary number A.

During a step 12, the carry propagation signals and diagonal-generation signals, respectively $t_0, \ldots, t_3$ and $q_0, \ldots q_3$, are produced from the bits of the input binary numbers A and B.

During a step 13, various correction signals $C_n^k$ are produced from the carry propagation and diagonal-generation signals.

During a step 14, these various correction signals are applied to the first estimations of the bits of the sum S and of the resulting carry so as to obtain the bits $s_0$, $s_1$, $s_2$ and $s_3$ of the sum and the resulting carry $z_4$.

A first example of this method is given in the following table with A=0101 as the first binary number (line 1 of the table), B=0011 as the second binary number (line 2) and $z_{in}$=0 as the input carry.

| Index n | 3 | 2 | 1 | 0 | $Z_{in}$ |
|---|---|---|---|---|---|
| A | 0 | 1 | 0 | 1 | 0 |
| B | 0 | 0 | 1 | 1 | |
| $t_n = a_n \oplus b_n$ | 0 | 1 | 1 | 0 | |
| $q_n = \overline{b_n} \oplus a_{n-1}$ | 0 | 1 | 1 | 0 | |
| $s_n^0 = a_n$ | 1 | 0 | 1 | 0 | |
| $C_n^0 = q_n$ | 0 | 1 | 1 | 0 | |
| $s_n^1 = C_n^0 \oplus s_n^0$ | 1 | 1 | 0 | 0 | |
| $C_n^1 = t_{n-1} \cdot q_{n-1}$ | 1 | 1 | 0 | | |
| $s_n^2 = C_n^1 \oplus s_n^1$ | 0 | 0 | 0 | 0 | |
| $C_n^2 = t_{n-1} \cdot t_{n-2} \cdot q_{n-2}$ | 1 | 0 | | | |
| $s_n^3 = C_n^2 \oplus s_n^2$ | 1 | 0 | 0 | 0 | |
| $C_n^3 = t_{n-1} \cdot t_{n-2} \cdot t_{n-3} \cdot q_{n-3}$ | 0 | | | | |
| $S = C_n^3 \oplus s_n^3$ | 1 | 0 | 0 | 0 | |

During a first step, the signals $t_n$ and $q_n$ as defined above are calculated. Then $t_n$=0110 (line 3) and $q_n$=0110 (line 4). A first estimation of each bit of the resulting sum (line 5) is next made and then the first correction signals to be applied to each estimated bit value are calculated (line 6).

Then a second estimation of the bits of the sum is derived therefrom, that is to say $s_0^1$, $s_1^1$, $s_2^1$ and $s_3^1$ (line 7).

The second correction signals of the second estimated values of the bits of the resulting sum are calculated (line 8).

The bits of the resulting sum are corrected a second time so as to obtain $s_3^2$ and $s_2^2$ (line 9).

The correction signals to be applied to the estimated bits $s_3^2$ and $s_2^2$ are calculated according to the formula set out in the table (line 10), and the estimated bit $s_3^3$ (line 11) is derived therefrom.

Finally, the last correction signal is calculated according to the formula set out in the table so as to obtain the final sum S, which is here equal to 1000 (line 12).

The initial expression of the sum being 1010 and the final expression being 1000, the corrections have in this example had a negative effect. Moreover, the emerging carry is zero. This is because with:

$$Z_4 = a_3 \oplus C_4^0 \oplus C_4^1 \oplus C_4^2 \oplus C_4^3 = 0,$$

with:

$$C_4^0 = t_3 \cdot q_3 = 0, \ C_4^1 = t_3 \cdot t_2 \cdot q_2 = 0, \ C_4^2 = t_3 \cdot t_2 \cdot t_1 \cdot q_1 = 0,$$
$$C_4^3 = t_3 \cdot t_2 \cdot t_1 \cdot t_0 \cdot q_0 = 0$$

The following table illustrates another example with A=1110 as the first binary number (line 1 in the following table), B=0101 as the second binary number (line 2) and $z_{in}$=1 as the incoming carry.

| Index n | 3 | 2 | 1 | 0 | $Z_{in}$ |
|---|---|---|---|---|---|
| A | 1 | 1 | 1 | 0 | 1 |
| B | 0 | 1 | 0 | 1 | |
| $t_n = a_n \oplus b_n$ | 1 | 0 | 1 | 1 | |
| $q_n = \overline{b_n} \oplus a_{n-1}$ | 0 | 1 | 1 | 1 | |
| $s_n^0 = a_n$ | 0 | 0 | 0 | 1 | |
| $C_n^0 = q_n$ | 0 | 1 | 1 | 1 | |
| $s_n^1 = C_n^0 \oplus s_n^0$ | 0 | 1 | 1 | 0 | |
| $C_n^1 = t_{n-1} \cdot q_{n-1}$ | 0 | 1 | 1 | | |
| $s_n^2 = C_n^1 \oplus s_n^1$ | 0 | 0 | 0 | 0 | |
| $C_n^2 = t_{n-1} \cdot t_{n-2} \cdot q_{n-2}$ | 0 | 1 | | | |
| $s_n^3 = C_n^2 \oplus s_n^2$ | 0 | 1 | 0 | 0 | |
| $C_n^3 = t_{n-1} \cdot t_{n-2} \cdot t_{n-3} \cdot q_{n-3}$ | 0 | | | | |
| $S = C_n^3 \oplus s_n^3$ | 0 | 1 | 0 | 0 | |

The initial estimation of the sum is here 0001 and the final expression is 0100. The corrections therefore had a positive effect. The emerging carry is here:

$$Z_4 = a_3 \oplus C_4^0 \oplus C_4^1 \oplus C_4^2 \oplus C_4^3 = 1$$

with $$C_4^0 = t_3 \cdot q_3 = 0, \ C_4^1 = t_3 \cdot t_2 \cdot q_2 = 0, \ C_4^2 = t_3 \cdot t_2 \cdot t_1 \cdot q_1 = 0,$$
$$C_4^3 = t_3 \cdot t_2 \cdot t_1 \cdot t_0 \cdot q_0 = 0$$

Figure 3:
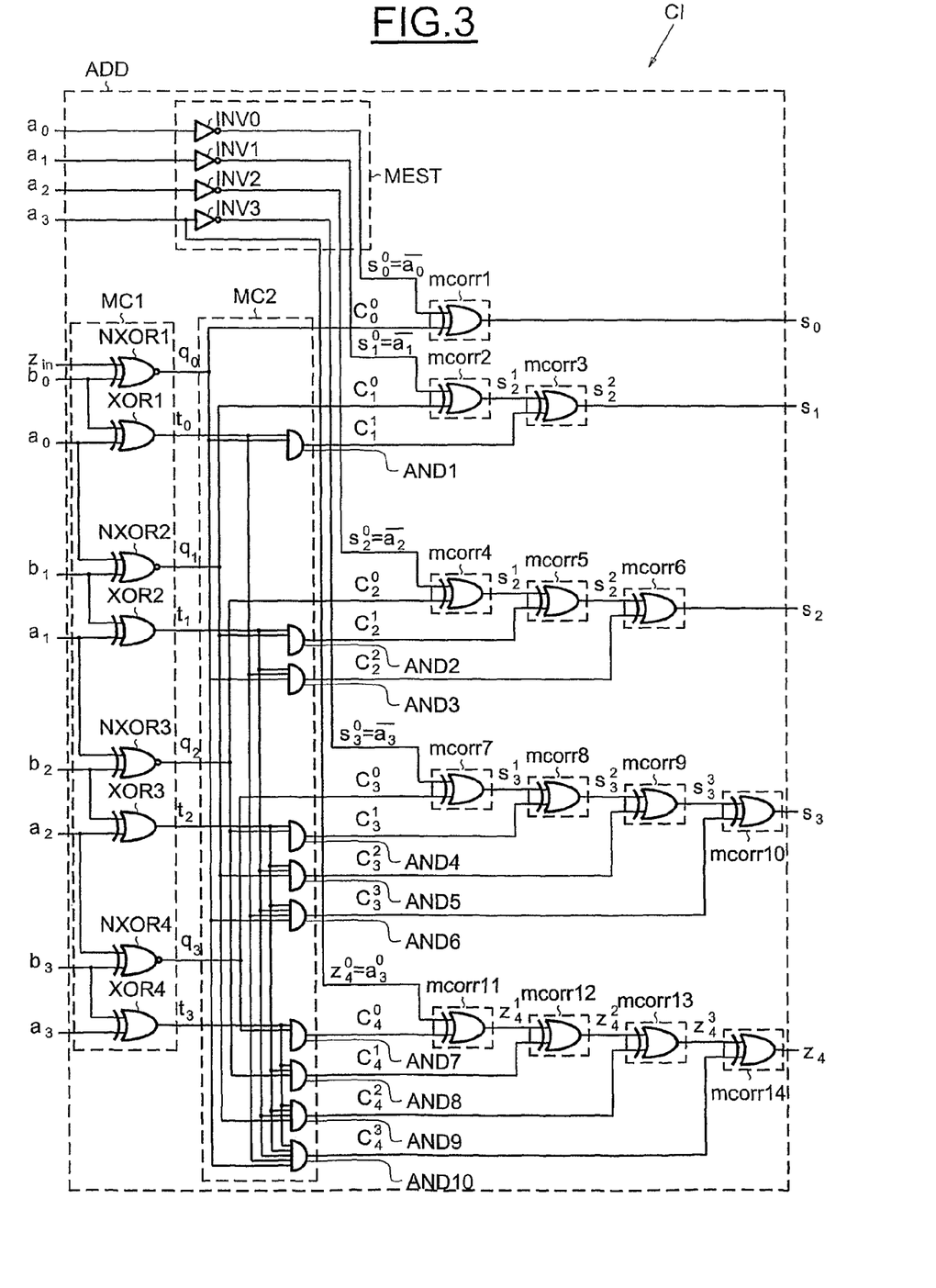
FIG. 3 depicts more precisely an embodiment of an adder according to an embodiment of the invention.

Reference is now made to FIG. 3, which illustrates an embodiment of the various modules of the adder according to the invention for implementing the method according to an embodiment of the invention.

In this example, the first calculation means MC1 comprises four pairs of "EXCLUSIVE OR" and "EXCLUSIVE OR complement" gates respectively NXOR1 and XOR1, NXOR2 and XOR2, NXOR3 and XOR3, NXOR4 and XOR4.

The first "EXCLUSIVE OR complement" gate NXOR1 receives as an input the input carry $z_{in}$ and the first bit $b_o$ of the second input binary number B, and delivers as an output the diagonal-generation signal $q_o$, produced according to the formula defined above.

The logic gate XOR1 receives as an input the first bit $b_0$ of the second binary number B and the first bit $a_0$ of the first binary number A. The logic gate XOR1 delivers as an output the carry propagation signal $t_0$, produced according to the formula defined above.

Likewise the logic gate NXOR2 receives as an input the first bit $a_0$ of the first binary number A and the second bit $b_1$ of the second binary number B, and delivers as an output the diagonal-generation signal $q_1$.

The gate XOR2 receives as an input the second bit $b_1$ of the second binary number B and the second bit $a_1$ of the first binary number A, and delivers as an output the carry propagation signal $t_1$.

The logic gate NXOR3 receives as an input the second bit $a_1$ of the first binary number A and the third bit $b_2$ of the second input binary number, and delivers as an output the diagonal-generation signal $q_2$.

The logic gate XOR3 receives as an input the third bit $b_2$ of the second input binary number B and the third bit $a_2$ of the first binary number A, and delivers as an output the carry propagation signal $t_2$.

The logic gate NXOR4 receives as an input the third bit $a_2$ of the first binary number A and the fourth bit $b_3$ of the second binary number B.

The logic gate XOR4 receives as an input the last bit $b_3$ of the second binary number B and the last bit $a_3$ of the first binary number A, and delivers as an output the carry propagation signal $t_3$. All the outputs of the gates NXOR1, XOR1, ..., NXOR4, XOR4 are connected to the input of the second calculation means MC2.

From the signals delivered by the first calculation means MC1, the second calculation means MC2 produces the various correction signals.

Given that the correction signal $C_0^0$ is equal to the diagonal-generation signal $q_0$, this is directly delivered at the output of the second calculation means MC2 to the correction means mcorr1.

Likewise, given that the correction signal $C_1^0$ is equal to the signal $q_1$, this is directly delivered at the output of the second calculation means MC2 to the correction means mcorr2.

In order to produce the correction signal $C_1^1$, the second calculation means MC2 comprises a logic "AND" gate AND1, which receives the signals $q_0$ and $t_0$ as an input and delivers $C_1^1$ as an output.

The signal $q_2$ is directly delivered at the output of the second calculation means MC2 to the correction means mcorr4, given that the signal $c_2^0$ is equal to the signal $q_2$.

To produce the correction signal $c_2^1$, the second calculation means MC2 comprises a logic "AND" gate AND2, which receives the signals $t_1$ and $q_1$ as an input and delivers the signal $C_2^1$. Likewise, to produce the signal $C_2^2$, the second calculation means MC2 comprises a logic "AND" gate AND3, which receives the signals $t_1$, $t_0$ and $q_0$ as an input and delivers the signal $C_2^2$.

To produce the correction signal $C_3^0$, the second calculation means delivers the signal $q_3$ directly as an output to the correction means mcorr7.

As for the preceding corrections signals, the correction signal $C_3^1$ is produced by means of a logic "AND" gate AND4, which receives the signal $t_2$ and the signal $q_2$ as an input. The correction signal $C_3^2$ is produced by means of a logic "AND" gate AND5, which receives the signals $t_2$, $t_1$ and $q_1$ as an input. The correction signal $C_3^3$ is produced by means of a logic "AND" gate AND6, which receives the signals $t_2$, $t_1$, $t_0$ and $q_0$ as an input.

To produce the correction signals for the resulting carry $z_4$, the second calculation means MC2 comprises four logic "AND" gates AND7, AND8, AND9, AND10. The logic "AND" gate AND7 receives at the signals $t_3$ and $q_3$ as an input and delivers the signal $c_4^0$ as an output. The second logic gate AND8 receives the signals $t_3$, $t_2$ and $q_2$ as an input and delivers the correction signal $C_4^1$ as an output.

The third logic gate AND9 receives the signals $t_3$, $t_2$, $t_1$ and $q_1$ as an input and delivers the correction signal $C_4^2$ as an output.

The last logic gate AND10 receives the signals $t_3$, $t_2$, $t_1$ and $q_0$ as an input and delivers the correction signal $C_4^3$ as an output.

The estimation means MEST can be implemented by means of four switches respectively INV0, INV1, INV2 and INV3, which receive respectively as an input the bits $a_0$, $a_1$, $a_2$ and $a_3$ and deliver as an output the signals $a_0$, $a_1$, $a_2$ and $a_3$ to the correction means. In addition, the estimation means MEST delivers directly as an output the most significant bit $a_3$ of the first binary number A, for producing the resulting carry $z_4$.

All the connection means mcorr1, ... mcorr14 are implemented by means of "EXCLUSIVE OR" gates.

The "EXCLUSIVE OR" gate implementing the correction means mcorr1 receives as an input the first estimation $s_o$ of the first bit of the sum S and the correction signal $C_0^0$, and delivers as an output the bit $s_0$.

The "EXCLUSIVE OR" gate mcorr2 receives as an input the first estimation $S_1$ of the second bit of the sum S and the correction signal $C_1^0$ and delivers as an output an intermediate signal $S_1^1$ corresponding to a second estimation $S_1^1$ of the second bit of the sum S. The "EXCLUSIVE OR" logic gate mcorr3 receives as an input the signal $S_1^1$ and the correction signal $C_1^1$ and delivers as an output the second bit $s_1$ of the sum S.

The "EXCLUSIVE OR" gate mcorr4 receives as an input the first estimation $S_2^0$ of the third bit of the sum S and the correction signal $C_2^0$ and delivers the signal $s_2^1$ as an output. The "EXCLUSIVE OR" gate mcorr5 receives as an input this signal $s_2^1$ and the correction signal $C_2^1$, and delivers the signal $s_2^2$ as an output. The "EXCLUSIVE OR" gate mcorr6 receives as an input the signal $s_2^2$ and the correction signal $C_2^2$ and delivers the third bit $s_2$ as an output.

Likewise, the "EXCLUSIVE OR" gate mcorr7 receives as an input the first estimation $S_3^0$ of the third bit of the sum S and the correction signal $C_3^0$ and delivers the signal $s_3^1$ as an output. The "EXCLUSIVE OR" gate mcorr8 receives as an input this signal $s_3^1$ and the correction signal $C_3^1$ and delivers the correction signal $s_3^2$ as an output to an "EXCLUSIVE OR" gate constituting the correction means mcorr9. In addition, the "EXCLUSIVE OR" gate mcorr9 receives the correction signal $c_3^2$ as an input and delivers the signal $S_3^3$ as an output. The "EXCLUSIVE OR" gate mcorr10 receives as an input the signal $s_3^3$ and the correction signal $C_3^3$ and delivers as an output the last bit $S_2$ of the sum S.

Likewise, for producing the resulting carry $z_4$, the correction means mcorr11 is implemented by an "EXCLUSIVE OR" gate that receives as an input the first estimation $z_4^0$ of the carry $z_4$ and the correction signal $c_4^0$ and delivers the signal $z_4^1$ as an output. The correction means mcorr12 comprises an "EXCLUSIVE OR" logic gate that receives as an input the signal $z_4^1$ and the correction signal $C_4^1$ and delivers the signal $z_4^2$ as an output to the correction means mcorr13. The means mcorr13 comprises an "EXCLUSIVE OR" logic gate that also receives the correction signal $C_4^2$ as an input and delivers the signal $z_4^3$ as an output intended for the "EXCLUSIVE OR" logic gate implementing the connection means mcorr14. The means mcorr14 also receives the correction signal $c_4^3$ as an input and delivers the resulting carry $z_{3-0}$ as an output.

Figure 4:
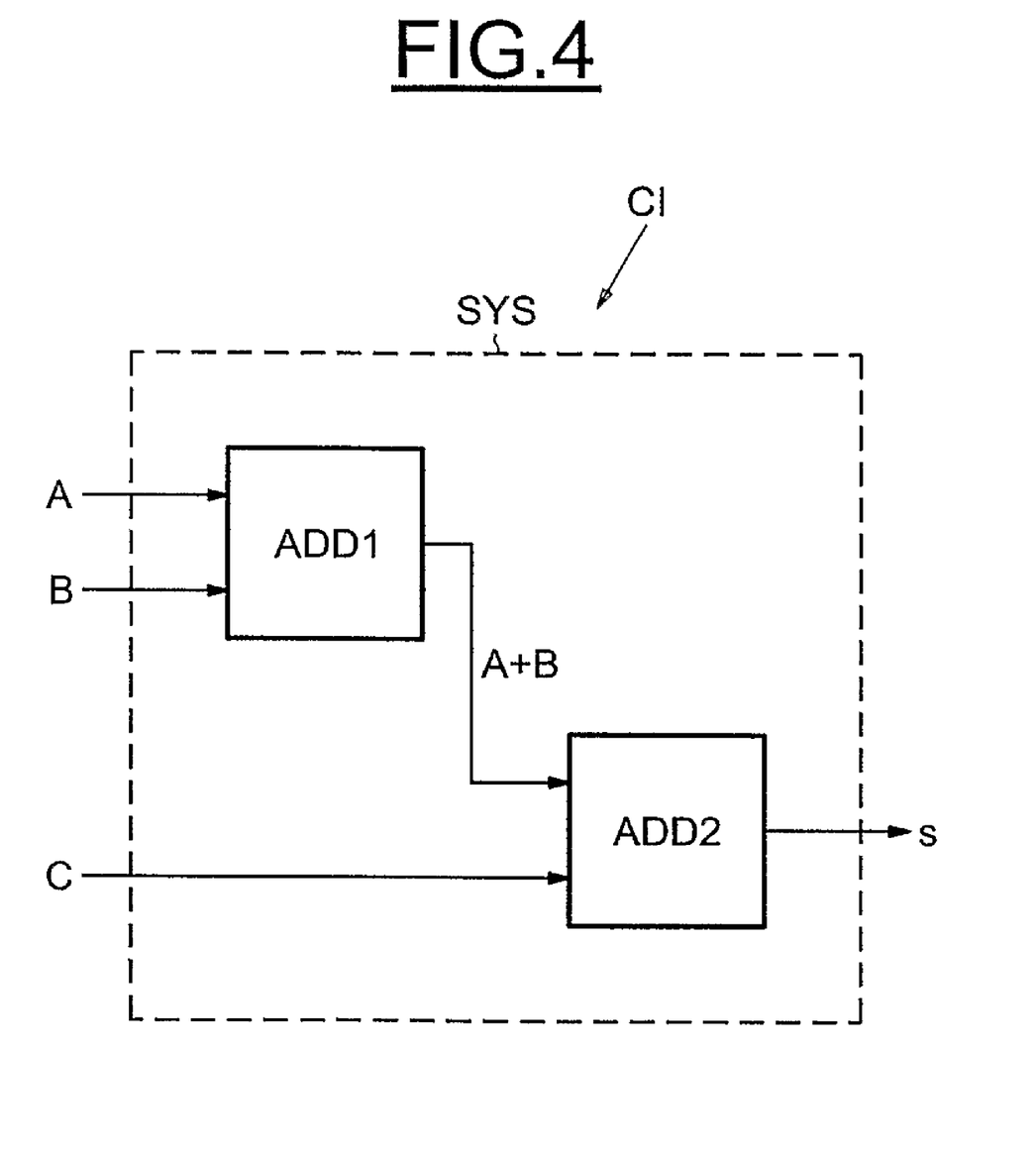
FIG. 4 depicts a system comprising several adders according to an embodiment of the invention.

Reference is now made to FIG. 4, which illustrates an integrated circuit comprising a system for making an addition with three binary numbers A, B and C.

The system SYS comprises a first adder ADD1 and a second adder ADD2. The first adder ADD1 receives as an input the first and second binary numbers respectively A and B and produces a sum A+B as an output.

The second adder ADD2 receives as an input the intermediate sum A+B as well as the third binary number C and produces a sum S corresponding to the sum of the three input binary numbers A, B and C.

For each additional binary number to be added, the system SYS comprises an additional adder.

Figure 5:
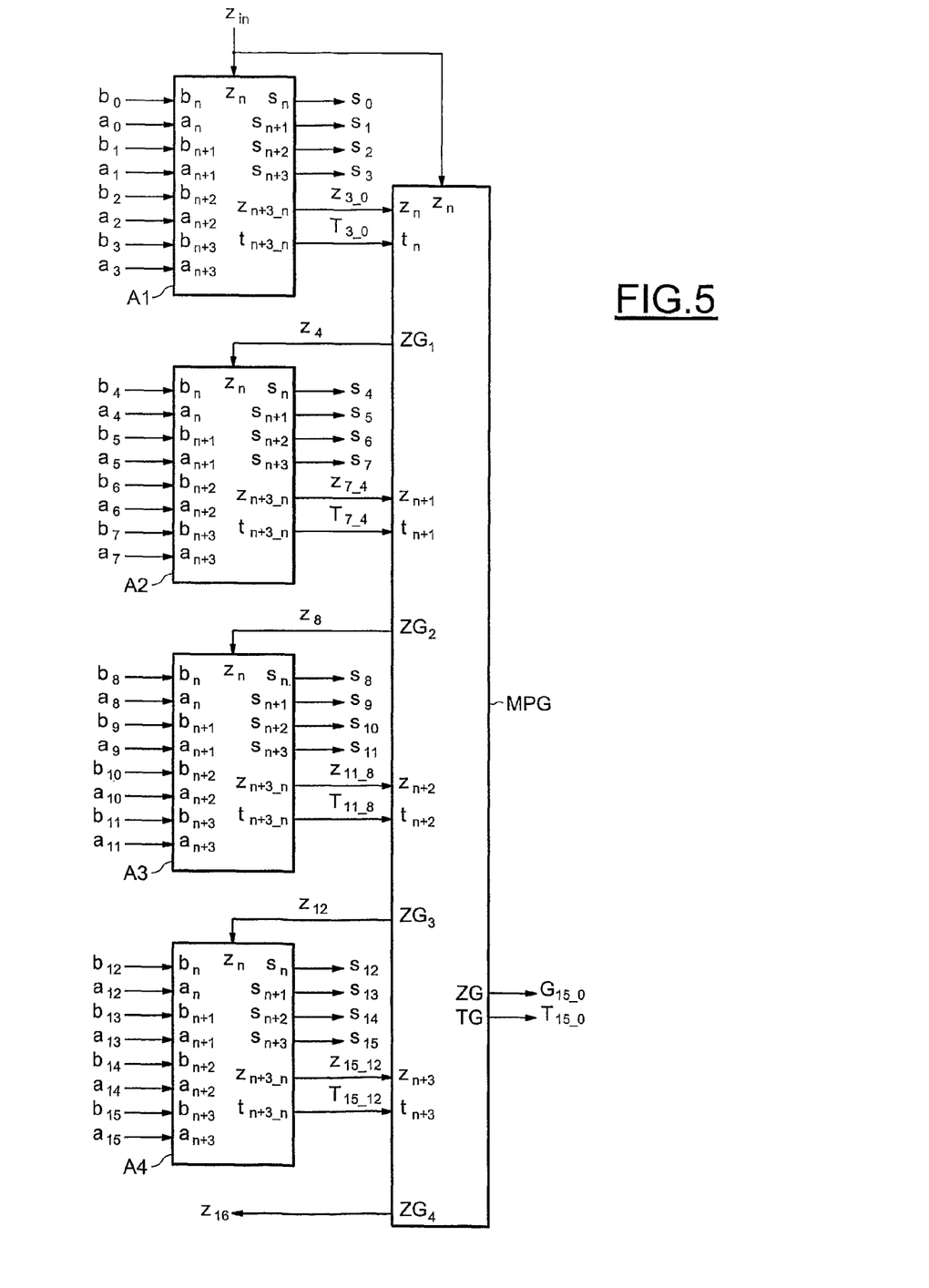
FIG. 5 depicts another system comprising several adders according to an embodiment of the invention.

Reference is now made to FIG. 5, which shows an adder on several levels or more precisely a 16-bit adder with group carry propagation.

This type of adder, produced conventionally, is well known to persons skilled in the art.

Figure 6:
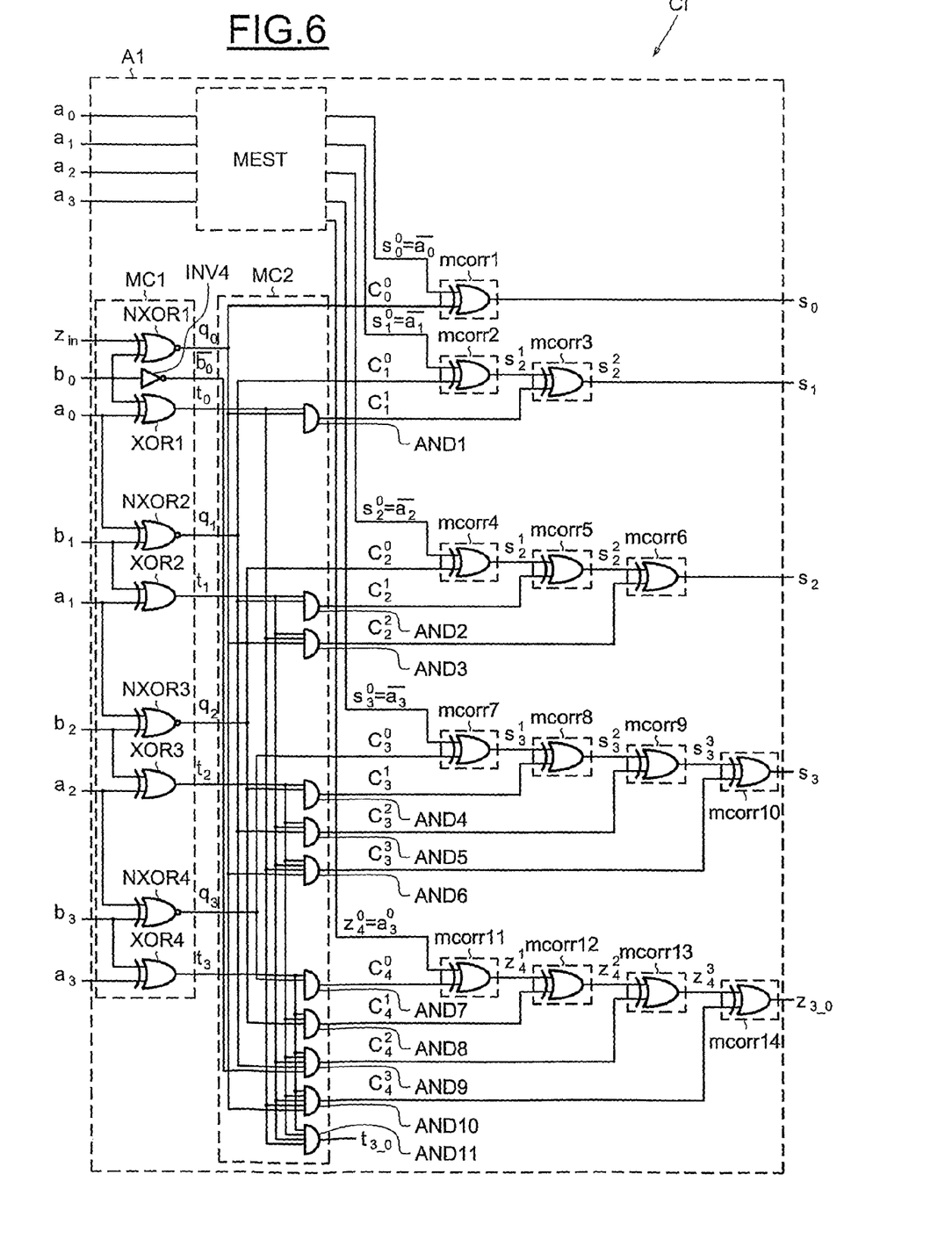
FIG. 6 depicts more precisely an adder included for example in the system shown in FIG. 5.

The 16-bit adder SYS comprises four adders $A_1, A_2, A_3$ and $A_4$ as described previously. More precisely, the adder A1 is shown in FIG. 6.

The second calculation means MC2 of the adder A1 comprises, in addition to the adder shown in FIG. 1, an additional output able to deliver a group propagation signal $t_{3-0}$. For this, the second calculation means MC2 comprises in this example an additional logic gate, here a logic "and" gate AND11, which receives as an input the signals $t_0, t_1, t_2,$ and $t_3$.

The logic gate AND10 has then been modified and receives as an input the signals $t_3, t_2, t_1, t_0$ as well as the complementary of the first bit $b_0$ of the second input number B.

The bit $\overline{b_0}$ is delivered by the first calculation means MC1, which for this embodiment comprises a switch INV4 that receives as an input the first bit $b_0$ of the second binary number B and delivers its complementary $\overline{b_0}$ as an output.

Reference is made once again to FIG. 5. The first adder A1 receives as an input the signals $b_0, a_0, \ldots, b_3, a_3$ and the input carry $z_{in}$, and delivers as an output the first four bits of the resulting sum $s_0, \ldots s_3$, the resulting carry $z_4$ as defined in FIG. 6, and the group propagation $T_{3-0}$ in the case of the adder A1. These signals are delivered to a group propagation module MPG, which receives as an input the resulting carry $z_{3-0}$ from the first adder $A_1$, the group propagation signal $T_{3-0}$ and the input carry $z_{in}$. The group propagation module MPG produces a new carry $z_4$ defined by: $z_4 = z_{3-0} \oplus T_{3-0} \cdot z_{in}$.

Likewise, the adders $A_2, A_3$ and $A_4$ receive respectively the input signals $b_4, a_4, \ldots b_7, a_7$ and $b_8, a_8, \ldots b_{11}, a_{11}$ and $b_{12}, a_{12}, \ldots, b_{15}, a_{15}$, as well as the resulting carries $z_4, z_8$ and $z_{12}$ produced by the propagation module MPG.

The adder $A_2$ delivers as an output the bits $s_4, \ldots s_7$ of the sum S, the adder A3 delivers the output bits $s_8, \ldots, s_{11}$ and the adder $A_4$ delivers the bits of the sum $s_{12}, \ldots, s_{15}$.

The module MPG generates a resulting carry $z_{16}$ such that:

$$z_{16} = z_{15-12} \oplus T_{15-12} \cdot z_{11-8} \oplus T_{15-12} \cdot T_{11-8} \cdot z_{7-4} \oplus T_{15-12} \cdot T_{11-8} \cdot T_{7-4} \cdot z_{3-0} \oplus T_{15-12} \cdot T_{11-8} \cdot T_{7-4} \cdot z_{3-0} \oplus T_{15-12} \cdot T_{11-8} \cdot T_{7-4} \cdot T_{3-0} \cdot z_{in}$$

as well as a group propagation signal $z_g$ such that:

$$z_G = z_{15-12} \oplus T_{15-12} \cdot z_{11-8} \oplus T_{15-12} \cdot T_{11-8} \cdot z_{7-4} \oplus T_{15-12} \cdot T_{11-8} \cdot T_{7-4} \cdot z_{3-0}$$

and a group propagation signal $t_G$ calculated according to the following expression:

$$T_G = T_{15-0} = T_{15-12} \cdot T_{11-8} \cdot T_{7-4} \cdot T_{3-0}|$$

The signals $z_G$ and $T_G$ correspond respectively to the generation and group propagation signals of all the adders A1, ..., A4.

Figure 7:
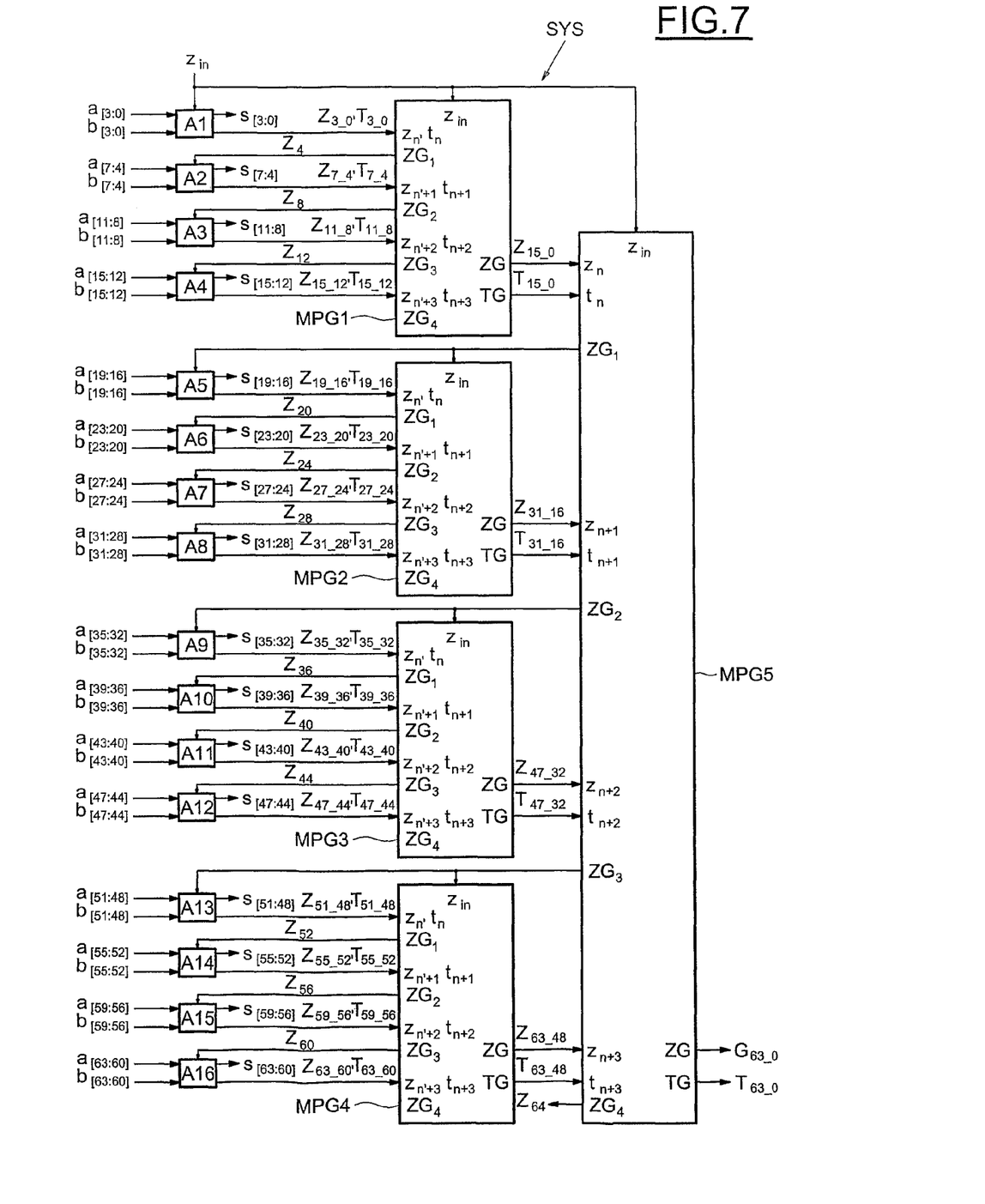
FIG. 7 shows another system comprising several adders according to an embodiment of the invention.

FIG. 7 also depicts an adder with propagation of the carry by group receiving 64 bits as an input. This type of adder, well known to persons skilled in the art, can be used with the adders as described in FIG. 6 as well as two levels of group propagation modules.

The system SYS comprises a first level consisting of four group propagation modules MPG1, MPG2, MPG3 and MPG4. Each group propagation module is connected to four adders, respectively $A_1, \ldots, A_4$ and $A_5, \ldots, A_8$ and $A_9, \ldots A_{12}$ and $A_{13}, \ldots, A_{16}$.

The second group propagation module level comprises a module MPG5 that receives as an input the output signals delivered by each group propagation module of the first level.

The adder as described above can be used in place of a conventional 64-bit adder, with group carry propagation in all configurations.

The present disclosure proposes a completely different implementation of an n-bit adder, able to be used in place of the standard adders in any configuration.

An aspect of the disclosure proposes an adder for reducing the number of vectors in the set of tests used to check the functioning of the logic gates that it comprises.

Although the present disclosure has been described with reference to one or more examples, workers skilled in the art will recognize that changes may be made in form and detail without departing from the scope of the disclosure and/or the appended claims.

The invention claimed is:

1. An n-bit adder of a first and second binary number, comprising:
    a first calculation means with 2n inputs for receiving the n values of bits of said first and second binary numbers and an additional input for receiving an input carry ($z_{in}$), said first calculation means being able to produce, from each of the n pairs of bit values of the same rank, a carry propagation signal ($t_n$), wherein the first calculation means is able furthermore to produce n diagonal-generation signals ($q_n$), each diagonal-generation signal being produced from the value of the bit of rank k of the second number, k varying between 0 and n−1, and the value of the bit of rank k−1 of the first number or of the input carry if said coefficient of rank k−1 does not exist, an estimation means able to perform a first estimation of each coefficient of the number resulting from the sum of the first and second numbers, taking the complementary of the value of the bit of corresponding rank of the first number, a second calculation means connected to the first calculation means and able to produce a set of correction signals from the propagation signals and diagonal-generation signals, and a correction block comprising n outputs and able to apply, to each estimated bit value of rank k of said sum, k+1 corrections by means of said correction signals, and to deliver as an output the n bits of the sum of the first and second numbers.

2. Adder according to claim 1, in which the estimation means is furthermore able to perform a first estimation of a resulting carry ($z_4$) of said sum of the first and second numbers, from the most significant bit of the first number, in which the second calculation means is furthermore able to produce a set of supplementary signals correcting said resulting carry, from the propagation signals and diagonal-generation signals, and in which the correction block furthermore comprises an additional output for delivering said resulting carry, and is able to apply, to the estimated bit value of the resulting carry, k+1 corrections by means of said supplementary correction signals.

3. Adder according to claim 1, in which the diagonal generation signal ($q_n$) of rank k is determined according to the following expression:

$$q_k = \overline{(b_k \oplus a_{k-1})}:$$

where:
$q_k$ is the diagonal-generation signal of rank k,
$b_k$ is the bit of rank k of the second binary number,
$a_{k-1}$ is the bit of rank k−1 of the first binary number.

4. Adder according to claim 1, in which the $p^{th}$ correction signal of the bit of rank k, with p varying between 0 and k, is determined according to the following expression:

$$C_k^p = q_k \text{ if } p = 0$$
$$C_k^p = \left[\prod_{i=1}^{p} t_{k-i}\right] \cdot q_{k-p} \text{ otherwise,}$$

where:
$C_k^p$ is the $p^{th}$ correction signal of the bit of rank k of the resulting sum,
$t_i$ is the carry propagation signal produced from the bits of rank i of the first and second binary numbers,
$q_k$ is the diagonal-generation signal of rank k.

5. Adder according to claim 1, in which the bit of rank k of the resulting sum is determined according to the following expression:

$$s_k = \overline{a_k} \oplus \sum_{i=0}^{k} C_k^i,$$

where:
$s_k$ is the bit of rank k of the resulting sum,
$a_k$ is the bit of rank k of the first binary number,
$C_k^i$ is the $i^{th}$ correction signal of the bit of rank k of the resulting sum.

6. Adder according to claim 1, in which the first calculation means comprises n pairs of "EXCLUSIVE OR" gates and "EXCLUSIVE OR complement" gates such that, for the $k^{th}$ pair, the "EXCLUSIVE OR complement" gate is able to receive as an input the bit of rank k of the second binary number and the bit of rank k−1 of the first binary number or the input carry if said bit of the first binary number of rank k−1 does not exist, and able to deliver the corresponding diagonal-generation signal as an output, and such that, for said $k^{th}$ pair, the "EXCLUSIVE OR" gate is able to receive the bits of rank k of the first and second binary numbers and is able to deliver the carry propagation signal of corresponding rank.

7. Adder according to claim 1, in which the second calculation means comprises, for producing each correction signal of the bit of rank k, k "AND" gates, the $i^{th}$ gate being able to produce a correction signal from the carry propagation and carry generation signals delivered as an input to said "AND" gates.

8. Adder according to claim 1, in which the correction block comprises, for producing the bit of rank k of the resulting sum, k+1 "EXCLUSIVE OR" gates connected in series, each gate being able to:

receive the estimated bit of rank k or the bit of rank k delivered by the "EXCLUSIVE OR" gate connected upstream, and a correction signal, perform a correction to the signal received as an input from said correction signal received.

9. System for adding j bits, such that j is greater than 2, comprising j−1 adders according to claim 1 and connected in series, each adder being able to receive as an input a first binary number and a second binary number corresponding to the sum of two other binary numbers, which is delivered by the adder connected upstream in the series.

10. System for adding j bits, such that j is greater than 2, comprising a set of adders according to claim 1 connected in parallel, in which said second calculation means of each adder:

furthermore comprises an output able to deliver a group propagation signal ($t_n$) corresponding to the product of all the carry propagation signals ($q_n$), produced by said first calculation means, is able to produce said set of supplementary signals for correcting said resulting carry, from the propagation signals ($t_n$) and the diagonal-generation signals ($q_n$), as well as the complementary signal of the first bit of the second input binary number, the system furthermore comprising at least one group propagation module connected to all the adders and able to receive said resulting carry and said group propagation signal ($t_n$) produced by each adder and to produce firstly the input carry of an adder from the resulting carry and the group propagation signal of the previous adder, and secondly a new resulting carry and a new group propagation signal from the resulting carries and group propagation signals of all the adders.

11. System according to claim 10, comprising a first set of propagation modules connected in parallel to the outlet of the adders, and another propagation module connected to the output of the said first set of propagation modules, able to receive the new resulting carry and the new group propagation signal of each propagation module of said first set, and able to produce, from each new resulting carry and each new group propagation signal, a new output carry and a new output group propagation signal.

12. Method of adding a first and second n-bit binary number, comprising:

a phase of receiving n bit values of the said first and second binary numbers and an input carry ($z_{in}$) by a circuit, a first calculation phase comprising production, by the circuit, from each of the n pairs of values of bits of the same rank, of a carry propagation signal ($t_n$), wherein the first calculation phase furthermore comprises the production of n diagonal-generation signals ($q_n$), each diagonal generation signal ($q_n$) being produced from the value of the bit of rank k of the second number, k varying between 0 and n−1, and the value of the bit of rank k−1 of the first number or of the carry if said coefficient of rank k−1 does not exist, a phase of estimating each coefficient of the number resulting from the sum of the first and second numbers, taking the complementary of the value of the bit of corresponding rank of the first number, a second calculation phase comprising production of a set of correction signals from the propagation signals and diagonal-generation signals, and a correction phase comprising application, to each estimated bit value of rank k of said sum, of k+1 corrections using said correction signals, and delivery as an output of the n bits of the sum of the first and second numbers.

13. Method according to claim 12, in which the estimation phase furthermore comprises a first estimation of a resulting carry ($z_4$) of said sum of the first and second numbers, from the last bit of the first number, in which the second calculation phase furthermore comprises production of set of supplementary signals for correction of said resulting carry, from the propagation signals ($t_n$) and diagonal-generation signals (qn), and in which the correction phase furthermore comprises delivery of the said resulting carry, and application, to the estimated bit value of the resulting carry, of k+1 corrections using said supplementary correction signals.

14. Method according to claim 12, in which the diagonal-generation signal of rank k ($q_k$) is determined according to the following expression:

$q_k = \overline{(b_k \oplus a_{k-1})}$:

where:
$q_k$ is the diagonal-generation signal of rank k,
$b_k$ is the bit of rank k of the second binary number,
$a_{k-1}$ is the bit of rank k−1 of the first binary number.

15. Method according to claim 12, in which the $p^{th}$ correction signal of the bit of rank k, with p varying between 0 and k, is determined according to the following expression:

$$C_k^p = q_k \text{ if } p = 0$$
$$C_k^p = \left[\prod_{i=1}^{p} t_{k-i}\right] \cdot q_{k-p} \text{ otherwise,}$$

where:
$C_k^p$ is the $p^{th}$ correction signal of the bit of rank k of the resulting sum,
$t_i$ is the carry propagation signal produced from the bits of rank i of the first and second binary numbers,
$q_k$ is the diagonal-generation signal of rank k.

16. Method according to claim 12, in which the bit of rank k of the resulting sum is determined according to the following expression:

$$s_k = \overline{a_k} \oplus \sum_{i=0}^{k} C_k^i$$

where:
$s_k$ is the bit of rank k of the resulting sum,
$a_k$ is the bit of rank k of the first binary number,
$C_k^i$ is the $i^{th}$ correction signal of the bit of rank k of the resulting sum.

17. Method according to claim 12, in which the first calculation phase comprises n pairs of "EXCLUSIVE OR" and "EXCLUSIVE OR complement" operations such that, for the $k^{th}$ pair of operations, the "EXCLUSIVE OR complement" operation comprises reception as an input of the bit of rank k of the second binary number and of the bit of rank k−1 of the first binary number or of the carry if said bit of rank k−1 of the first binary number does not exist, and comprises delivery as an output of the corresponding diagonal-generation signal, and such that, for said $k^{th}$ pair of operations, the "EXCLUSIVE OR" operation comprises reception of the bits of rank k of the first and second binary numbers and delivery of the carry propagation signal of corresponding rank.

18. Method according to claim 12, in which the second calculation phase comprises, for producing each correction signal of the bit of rank k, k "AND" operations, the $i^{th}$ operation comprising production of a correction signal from the carry propagation and carry generation signals.

19. Method according to claim 12, in which the correction phase comprises, for production of the bit of rank k of the resulting sum, k+1 "EXCLUSIVE OR" operations in series, comprising reception of the estimated bit of rank k or of the bit of rank k processed during the preceding "EXCLUSIVE OR" operation of the correction phase, and a correction signal, each "EXCLUSIVE OR" operation comprising correction of the signal received as an input, from said correction signal.

* * * * *